United States Patent [19]
Miskowicz

[11] 4,163,128
[45] Jul. 31, 1979

[54] SAFETY BUCKLE WITH SWITCH

[75] Inventor: John S. Miskowicz, Rolling Prairie, Ind.

[73] Assignee: Gateway Industries, Inc., Chicago, Ill.

[21] Appl. No.: 834,248

[22] Filed: Sep. 19, 1977

[51] Int. Cl.² .................. H01H 3/20; H01H 1/42; A44B 11/26
[52] U.S. Cl. ..................... 200/61.58 B; 24/230 A
[58] Field of Search ............. 200/61.58 B, 241, 242; 24/230 R–230 TC, 230 A

[56] References Cited
U.S. PATENT DOCUMENTS

| | | | |
|---|---|---|---|
| 3,833,781 | 9/1974 | Rumpf | 200/61.58 B |
| 3,996,648 | 12/1976 | Romanzi, Jr. | 24/230 A |
| 4,015,094 | 3/1977 | Gavagan et al. | 200/61.58 B |
| 4,052,775 | 10/1977 | Gavagan et al. | 24/230 A |
| 4,060,878 | 12/1977 | Dyki | 200/61.58 B X |
| 4,064,603 | 12/1977 | Romanzi, Jr. | 24/230 A |

*Primary Examiner*—James R. Scott
*Attorney, Agent, or Firm*—Fitch, Even & Tabin

[57] ABSTRACT

This invention relates to a safety belt buckle having an electrical switch means located beneath the buckle base of the buckle and operable by insertion of a tongue plate into latching engagement with a latching mechanism within the buckle. The switch is constructed of inexpensive elongated contact strips or arms which are formed with integral locating means for press fit engagement into molded portions of a plastic cover housing thereby aligning and holding the contacts in the desired position relative to one another. An actuator for actuating the contact arms is preferably in the form of a lever pivotally mounted in the cover housing and having the first cam surface for positively camming one contact arm from the other contact and a second cam surface for engaging the other contact and driving it away from the first contact arm. A bolster spring means returns the actuating lever to its tongue plate sensing position. Suitable insulating means are provided for protecting the contact arms from contact with the metal operating parts of the latching mechanism of the buckle.

8 Claims, 11 Drawing Figures

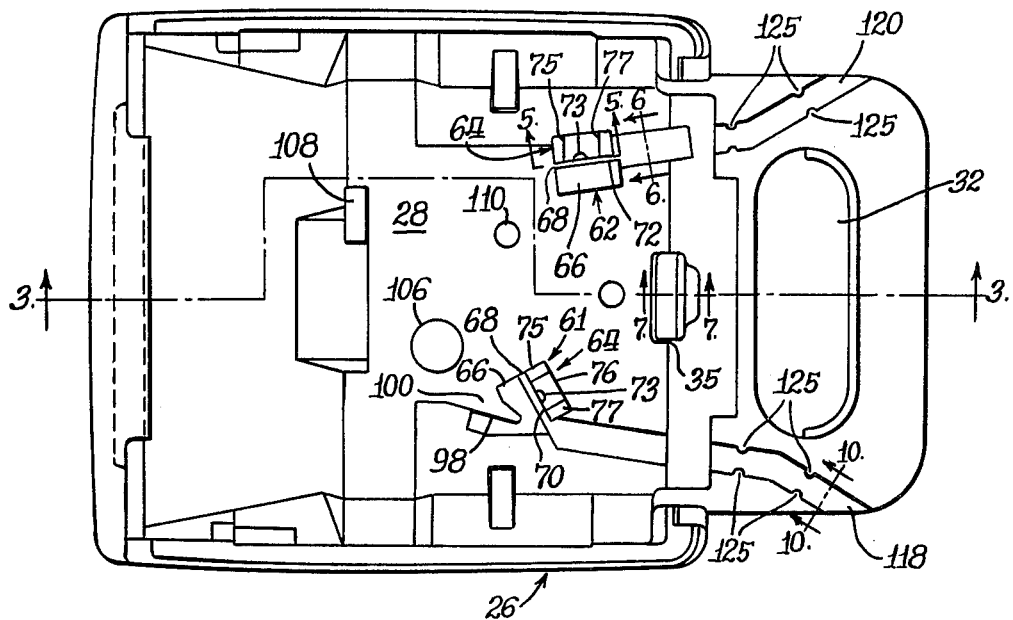
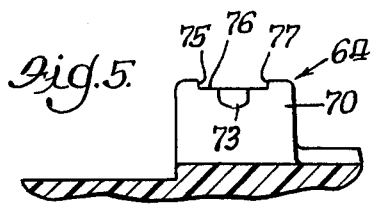
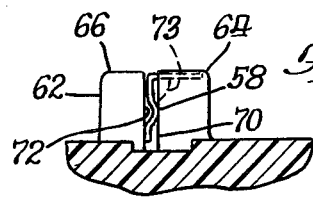
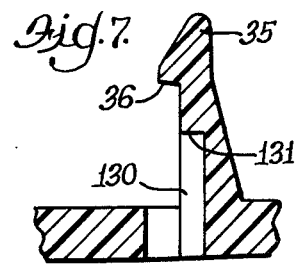
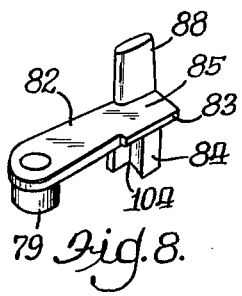
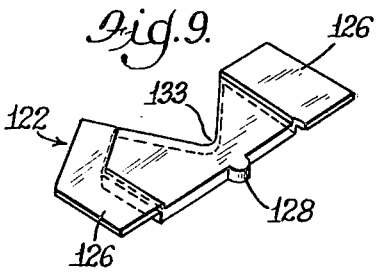
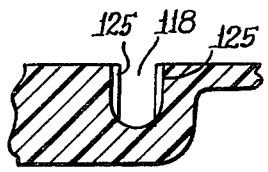
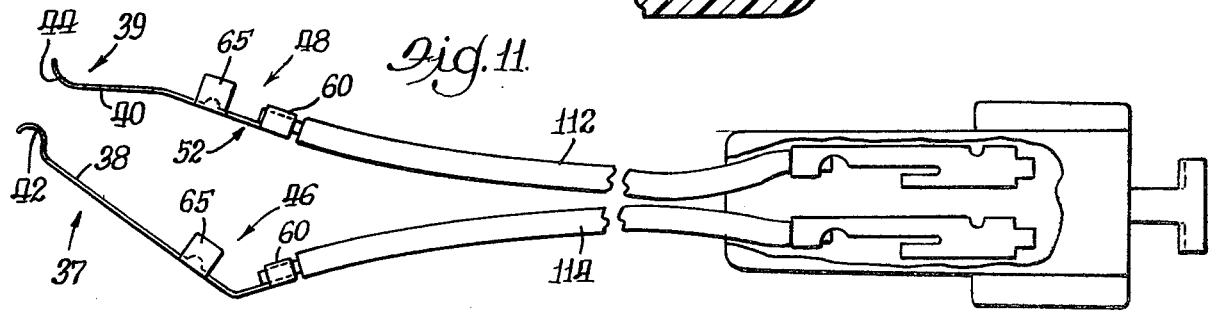

SAFETY BUCKLE WITH SWITCH

BACKGROUND OF THE INVENTION

This invention relates to a seat belt buckle having an electrical switch therein for operation by the insertion of a tongue plate or D-ring into operative connection with the belt buckle.

The switch within the seat belt buckle is for the purposes of controlling electrical circuits which indicate whether or not a seat belt has been buckled by a vehicle occupant. Typically, a warning buzzer circuit is actuated if a vehicle is started without the safety belt being buckled.

Some safety belt buckles with switches therein have been used commercially in automobiles. Other safety belt buckle switches have been proposed and have failed because they were either too expensive or failed to meet the auto manufacturer's specifications or federal government's safety regulations. It will be appreciated that safety belt buckles are subjected to severe reliability and environmental tests as they may be used in extremely hot or cold temperatures and in dirty and dusty environments or in hot and humid environments. The hot and humid environments tend to cause corrosion whereas the dirt and dust tend to prevent operation particularly of switches. Moreover, the lead wire connections to the buckle switches must be sufficiently strong to withstand pull tests and flexural tests. Switches for seat belts must have a relatively high cycle life in that they may be used frequently over a long life for a vehicle with little care. Preferably, the switch should be small to be incorporated into the buckle. Also, it should be constructed with relatively few inexpensive parts and avoid costly assembly techniques such as used in threaded nuts and bolts or rivets.

Accordingly, a general object of the present invention is to provide a new and improved, as contrasted to the prior art, safety belt buckle having a switch therein.

BRIEF DESCRIPTION OF THE DRAWINGS

Other objects and advantages of the invention will become apparent from the following detailed description taken in connection with the accompanying drawings in which:

FIG. 4 is a top view of the belt buckle housing.

FIG. 5 is a vertical sectional view along the line 5—5 on the buckle housing of FIG. 4.

FIG. 6 is an end view taken along the line 6—6 in FIG. 4.

FIG. 7 is a vertical sectional view along the line 7—7 of FIG. 4.

FIG. 8 is a perspective view of a switch actuator used in the present invention.

FIG. 9 is a perspective view of the insulating plate used in the present invention.

FIG. 10 is an end view taken along the line 10—10 of FIG. 4 of a channel in the buckle housing; and FIG. 11 is a top view of the contact arms and connecting wires and connector body used in the present invention.

DESCRIPTION OF THE PREFERRED EMBODIMENT

The seat belt buckle carries an electrical switch having two flexible, movable contacts each of which is directly engaged and shifted by an actuating means. A portion of the actuating means extends into the plane of travel of the latch plate or D-ring for operation thereby. The actuating means first engages one flexible contact arm to wipe it along the other contact arm and, as the latch plate continues into the belt buckle, the actuating means causes the other contact arm to flex away from the first contact arm to assure an open switch condition. The contact arms are formed of simple parts and are readily aligned and secured in position by wedging or snapping into molded plastic portions of a buckle cover. Insulating means may also be readily snapped or wedged into position to prevent engagement by the metal buckle with the electrical contacts.

Figure 1:
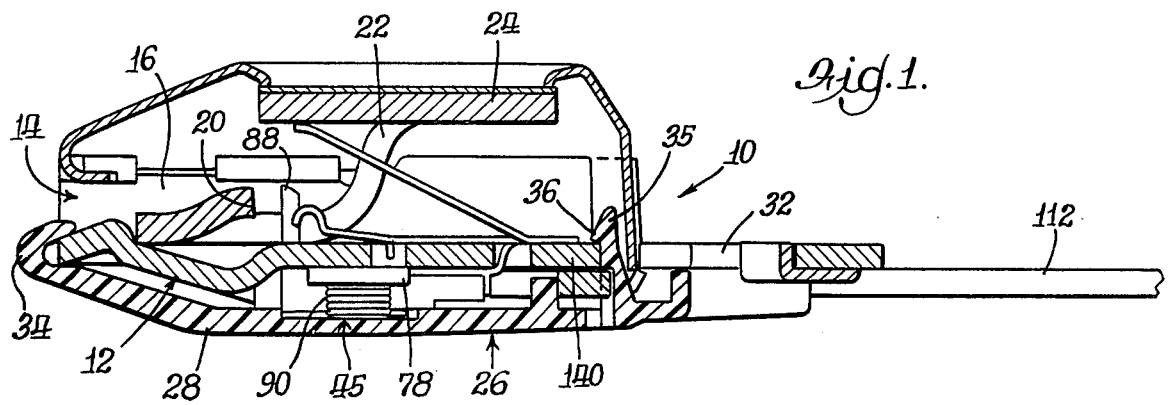
FIG. 1 is a vertical sectional view along the longitudinal center line of a buckle having an electric switch and embodying the present invention.

Turning now to a more detailed description of the preferred embodiment of the present invention, FIG. 1 illustrates an example of a safety belt buckle 10 in which the present invention may be used. The buckle includes a buckle body 12 which is to be attached to one-half of a safety belt or some other structural member. A latch plate is attached to a second belt half or some other structural member. The safety belt may be fastened about a passenger or occupant by inserting the latch plate into an end slot 14 and along channel 16 of buckle body 12 until a raised latch surface 20 of a latch lever 22, which is pivotally mounted on the buckle body, snaps into an opening in the latch plate, thereby preventing withdrawal of the latch plate from the buckle body. The latch plate may be released by depressing a push-button 24 to pivot the latch lever 22 downwardly until the surface 20 is withdrawn from the opening in the latch plate, thus permitting withdrawal of the plate.

Figure 2:
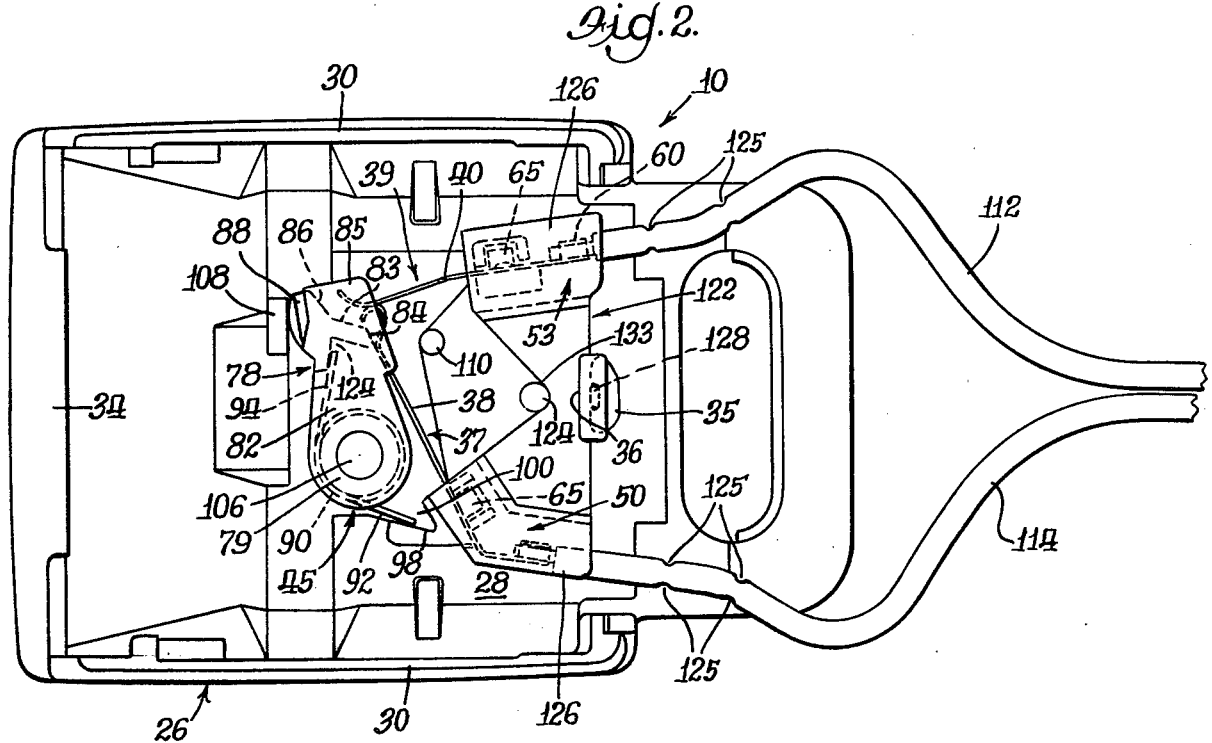
FIG. 2 is a top view, with the buckle operating mechanism removed, of the buckle shown in FIG. 1.

Buckle body 12 and latch lever 22 are mounted on plastic buckle housing 26 which is secured to the underside of the buckle body. Buckle housing 26 includes a generally flat bottom wall 28 and a pair of upstanding side walls 30 (FIG. 2). A rearwardly extending portion of the bottom wall is slotted for registering with the seat belt attachment slot 32 in the buckle body. The buckle housing includes a front lip 34, which overlaps the front edge of the buckle body (FIG. 1) and a rearward upstanding plastic hook 35 with an enlarged head 36 which snaps through an opening in the buckle body 12 to secure buckle housing 26 thereto. The preferred buckle is described in detail in copending application Ser. No. 727,181 filed Sept. 29, 1976, now U.S. Pat. No. 4,064,603 which is hereby incorporated by reference.

Heretofore, some proposals suggested for switches for use in seat belt buckles were ultimately found to be too expensive or to fail the various environmental and cycling tests that must be met by a commercially acceptable buckle switch. The driver's seat belt buckle may be actuated thousands of times during its life and may be subject to dust and dirty environments as well as hot and humid climates which expedite corrosion. On the other hand, the switch may be subject to extreme cold and may be dropped or hit with objects and it should not break or malfunction. Thus, the switch should be reliable and positive in its operation despite these conditions. From a cost standpoint, the use of nuts or rivets or other costly assembly techniques have added prohibitive costs to these switches. Further, the switch should not be too bulky as it needs to be incorporated in a small buckle. Thus, the twin needs of low cost and reliability must be satisfied for a commercially successful buckle with a switch.

In accordance with the present invention, a low cost switch and buckle assembly capable of meeting the automotive safety specifications and governmental safety regulations is achieved by inexpensively constructed and assembled flexible electrical contact arms 37 and 39 each of which is positively flexed apart by an actuator 78 and kept apart by the actuator when the switch is open. The preferred switch contact arms are inexpensively made by being formed from integral portions of terminal connectors 46 and inexpensively assembled into the plastic buckle housing 26 by a press or snap fitting therein. The ends 42 and 44 of the respective contact arms are disposed for wiping contact with each other to reduce contaminant accumulations. Herein, the flexible contact arms are biased to their closed position and have sufficient force to shift their actuator to a position for engagement with the latch plate. However, it is preferred to provide a booster biasing means 45 for urging the actuator to its tongue engaging position and to provide sufficient force to overcome dirt or salt in the buckle. As will be explained in greater detail, the metallic contact arms are insulated from contact with metal parts of the buckle by inexpensive and simple plastic shield means.

In the preferred embodiment, the two movable contacts are each formed from a shaped body of a good flexible contact material such as spring phosphor bronze alloy. Hereinafter, the first contact arm 37 is termed contact spring 38 and the second flexible contact arm 39 is termed contact leaf 40 (FIG. 11). Contact spring 38 and contact leaf 40 have curved wiping end portions 42 and 44, respectively, which wipe to prevent accumulations of contaminants thereon.

In accordance with the present invention, the terminal ends 50 and 52 of the respective contact arms 37 and 39 are easily assembled by press-fitting the same into an upstanding connector block 61 and 62 molded integral with the bottom housing wall 28. More specifically, each of the connector blocks is split and defines an open channel 68 between opposite halves 64 and 66 between which is inserted the connector terminal ends 46 and 48. The latter are pressed into the open channels 68 and are aligned and located relative to each other and to the buckle housing 26 by means such as locator shoulders 75, 77, which abut opposite walls of a transversely extending tab 56 formed on each of the connector terminal ends 46 and 48. The tab is pushed down into contact with a flat upper wall 76 on the connectors blocks 64 between the shoulders 75 and 77.

Preferably, the connector tabs are guided into a position between the shoulder walls 75 and 76 by means of a guiding dimple-shaped recess 73 extending downwardly on the inner side of the connector block halves 64. Herein, the connector is formed with a projecting circular dimple 58, as best seen in FIG. 6, which is generally hemispherical in shape and slides downwardly along the dimple-shaped recess 73 into the slot 68. When the connector end 46 or 48 is fully depressed into the connecting block, the tab lies between the shoulders 75 and 76 with the connector dimple 58 abutting one interior wall 70 of the connector block half 64 and with the other side of the connector abutting the opposite vertical wall 72 of the connector block half 66. The connector is sized to require a firm press or push into the slot 68 so as to remain there despite the moving and turning or other usual forces being applied to the buckle or to the wires 112 and 114.

The rearward portion of the connector ends have the crimped portions 60 which encircle a crimp directly onto the respective uninsulated electrical wires of the lead wires 112 and 114.

The actuator 78 is pivoted by the insertion of the latch plate from a first or forward position to a second or rearward position in which the actuator has shifted the contact arms 37 and 39 to another position, in this instance, an open contact position. The illustrated actuator has a generally tubular body portion 79 with a hollow interior for telescoping onto an upstanding post 106 molded in the bottom wall 28 of the housing thereby mounting the actuator for turning about an axis through the center of the post. The actuator has a laterally extending lever-like portion 82 on the outer end of which is an upstanding projection or finger 88 which extends upwardly into an opening in the latch lever 22 at a position rearward of the latch surface 20. The latch plate must strike the projection 88 and force the projection rearwardly before it can latch with the latch lever 22, as will be described later.

To achieve the preferred wiping and separating action for the contact ends 42 and 44, the actuator 78 is formed with first and second cam surfaces 84 and 86 which cam the contact spring 38 and a contact leaf 40, respectively. Herein, the contact spring 38 is shifted from and wiped along the contact arm by the cam surface 84 prior to the abutment of the cam surface 86 with the contact leaf 40 which is then deflected outwardly from the contact spring 38. This is achieved by spacing the cam surface 84 rearwardly of the cam surface 86 both of which are formed on and depend from the underside of the lever portion 82 of the actuator. The cam surfaces are separated by an inclined wall 83, as best seen in FIG. 2. To prevent any metal from above contacting the contact arms, the actuator is preferably formed with an insulating flat shield 85 projecting over and rearwardly of the cam surfaces 84 and 86 and overlying the contact ends, as best seen in FIG. 2.

The booster spring means 45 biases the actuator 78 to the first or forward position against a forward stop 108 on the buckle housing 26 to place the upstanding latch plate engaging projection 88 in an exactly located forward position relative to the latch lever 22 so that the latch plate must displace the actuator before the latch plate can latch to the latch lever 22. The preferred booster spring means 45 is in the form of a coiled spring 90 encircling loosely the outer surface of the tubular body 80 of the actuator with one end 92 of the spring abutted against an upstanding wall 98 in a crook-shaped spring end receiving recess 100. The wall 98 is integrally molded to the buckle housing 26 and projects upwardly from the bottom housing wall 26. The opposite end 94 of the spring is flexed and inserted into a crook-shaped opening 104 in the actuator 78 at a location rearwardly of the cam surface 84. As seen in FIG. 2, the flexed spring end 94 will assure return of the actuator to abut the forward stop 108 when the latch plate is removed. The contact spring 38 has sufficient force to return the actuator against the forward stop if the booster spring 90 should fail and thus the contact spring acts as a fail/safe spring.

The contact arms 37 and 39 are prevented from being damaged by overflexing in the rearward direction by a rear stop 110 in the form of an upstanding projection molded into the buckle housing 26 and located to abut the actuator 78 to limit the extent of its clockwise turning, as viewed in FIG. 2, by an inserted latch plate or other object. More specifically, contact spring 38 swings back to abut the stop 110 and will be sandwiched between the cam surface 84 and the stop 110 should contact 38 be bent that far. The rearward edge of the insulating wing 85 will pass over the top of stop 110.

The wires 112 and 114 are preferably secured to the buckle and to the buckle housing 26 in an inexpensive manner which prevents the wires from being pulled from the buckle housing and from being disconnected at their interior ends from crimped ends 50 and 52 of the connector terminals 46 and 48. Some strain relief is also provided against breaking by flexing of the lead wires 112 and 114 during buckle usage. Herein, the preferred manner of assembly is by means of a pair of channels 118 and 120 molded into the rearwardly extending portion 32 of the buckle housing to provide generally long flat support surfaces on the rear portion 32 of the buckle housing for supporting the lead wires 112 and 114. The wires are pressed into the channels 118 and 120 with opposed pairs of projections 125 on the opposite channel walls pinching therebetween the inserted wires at two longitudinally spaced locations along each wire. The projections 125 define a narrowed throat with round walls which will compress the insulation of the wires without damaging the same.

Figure 3:
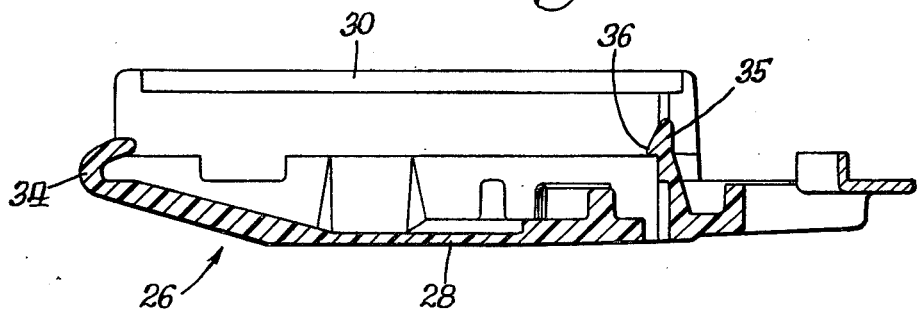
FIG. 3 is a side view of the buckle housing taken along the line 3—3 in FIG. 4.

The terminal connector 46 are insulated from contact by the overlying metal buckle parts by a winged insulating plate 122 (FIGS. 2 and 9) having a pair of wings 126 overlying the connector ends 50 and 52, as best seen in FIG. 2. For ease of assembly and for a low cost, the insulating plate also snaps into position and is held thereby against shifting. To this end, a small nib 128 projects rearwardly from the central rearward edge of the insulating plate for insertion into a recess 130 in the upstanding hook 35 (FIGS. 3 and 7) with the top of the nib abutted against an overhead wall 131. A forward V-shaped edge wall 133 on the insulating plate abuts the rearward side of an upstanding pin 124 integrally molded to the buckle housing bottom plate 28. Herein, the central body of the insulated plate has a thicker cross section than the wings 126. The insulating plate is assembled and held by inserting the nib 128 into the recess with the wings 126 being inclined upwardly and forwardly and then pressing down on the forward end of the insulating plate and wedging the edge wall 133 down along the pin 124 until the wings 126 are generally horizontal. The wires 112 and 114 extend to a connector body 116 which has terminal connectors therein, as best seen in FIG. 11.

In operation, contact spring 38 and contact leaf 40 are normally closed (FIG. 2). Projection 88 of actuator 78 extends through an opening in the latch lever 22 into the path of travel of the latch plate (FIG. 1). The latch plate is inserted into end slot 14 and travels along channel 16 to hit a raised latch surface 20 of latch lever 22 which is pivotally mounted on the buckle body and to pivot the latch lever downwardly. Insertion of the latch plate is continued until latch surface 20 snaps into an opening in the latch plate, thereby preventing withdrawal of the latch plate from the buckle body. While the latch plate is being inserted into the buckle, the leading edge of the latch plate engages actuator 78 and pivots it around its supporting post 106. During the initial pivoting movement, abutment surface 84 of actuator 78 cams the movable end 42 of contact spring 38 rearwardly to wipe along contact leaf 40. As actuator 78 continues to pivot, contact spring 38 flexes away from contact leaf 40 which in turn is being cammed away from contact spring 38 by curved cam surface 86 of actuator 78 which abuts the curved end 44 of the contact leaf and moves it outwardly toward a side of the buckle. Normally, this motion continues until raised latch surface 20 of latch lever 22 snaps into the opening in the latch plate. The insertion movement of the tongue plate is less than would force the spring 38 to abut the post 110. It requires an insertion of a foreign object into the buckle to swing the contact spring 38 to abut the limiting post 110 which will prevent further flexing of contact arms 38 and 40 and thereby prevent overflexing of the contact arms.

The latch plate may be released by depressing pushbutton 24 to pivot the latch lever 22 downwardly until the raised latch surface 20 is withdrawn from the opening in the latch plate thus permitting withdrawal of the plate. As the latch plate is withdrawn, actuator 78 pivots in the other direction around post 106 driven by the force of spring 90 and also driven by the force of the flexed control spring 38 and contact leaf 40. As actuator 78 pivots, the wiping end portion 42 of contact spring 38 comes into contact with contact leaf 40 and wipes along contact leaf 40 until actuator 78 comes into contact with the limiting forward post 108.

The limiting rearward post 110 prevents overflexing as would cause a permanent deformation of contact spring 38 and contact leaf 40. These contact arms are further protected by spring 90 in that the force that can be applied to contact spring 38 and contact leaf 40 as the latch plate engages actuator 78, is limited by spring 90. Furthermore, should spring 90 break, the operation of the switch will not be impaired because the tension force in contact spring 38 and contact leaf 40 is sufficient to return actuator 78 to its normal position when the switch is closed. In addition, the wiping action of contact spring 38 and contact leaf 40 cleans the contacting portion of any dirt or salt buildup during normal use.

The assembly of the buckle does not require any nuts or fasteners as the actuator 78 merely slips on the post 106 and is held thereon when bottom wall 140 of the buckle body 12, as best seen in FIG. 1, is connected by the hook 35 to the plastic housing. As previously stated, the electrical contact arms and the overlying insulating plate 122 merely are inserted and pressed into position without fasteners or staking. Again, the overlying bottom wall 140 of the buckle body 12 will hold the insulating plate and contact arms from lifting from the cover housing 26. Thus, the overlying buckle body wall 140 directly or indirectly holds the actuator or the switch contacts in place on the cover housing without the use of any separate fasteners or assembly operations which would add significant additional cost to the switch.

Modifications of the present invention will be apparent to those skilled in the art, some being apparent only after study, and others being merely matters of routine electronic design. As such, the scope of the invention should not be limited by the particular embodiment and specific instruction herein described, but should be defined only by the appended claims and equivalents thereof.

Various features of the invention are set forth in the following claims.

What is claimed is:

1. In a safety belt buckle, the combination comprising a buckle housing, a latch lever, opening means in said housing for receiving a latch plate to latch with said latch lever, switch means in said housing for indicating the presence of said latch plate in said opening means, said switch means comprising a pair of flexible contact arms movable between an open position in which said arms are spaced apart and a closed position in which said arms touch, and a one-piece actuator for moving said arms between open and closed position, said actuator being pivotally mounted to said housing at one end and having a portion at the other end extending into said opening means and further having at the other end a first surface for engaging one of said arms and a second surface for engaging the other of said arms to bend said other arm relative to said one arm when said actuator is moved, said first surface being disposed to cause said first one contact arm to slideably disengage from said second arm when said latch plate is inserted and then to shift said second contact arm further away from said first contact arm.

2. A buckle in accordance with claim 1 in which said switch means is located in a portion of a buckle housing beneath the latch lever.

3. A safety belt buckle in accordance with claim 1 in which said actuator is spring-loaded to be spaced from said contact arms when said latch plate is not residing in said opening means.

4. In a seat buckle for latching a tongue plate and for indicating a latched or unlatched condition, the combination of:
a metal buckle base having a bottom wall with openings therein,
a latching means mounted in said buckle base at a location above said buckle base for latching engagement with said tongue plate,
a plastic housing covering said bottom wall of said buckle base,
a switch means mounted in said buckle base for sensing the insertion of the tongue plate into latching engagement with said latching means,
first and second electrical contacts for said switch means wedgingly secured to said plastic housing beneath said bottom wall of said buckle base at predetermined locations and mounted for movement between open and closed positions relative to one another by said plastic housing,
an actuator mounted on said plastic housing and having an upstanding portion projecting upwardly through an opening in said bottom wall of said buckle base for abutment by said tongue plate and shiftable thereby relative to said plastic housing, and
cam means on said actuator for shifting said contacts to one of said positions with movement of said actuator.

5. A seat buckle in accordance with claim 4 in which slotted receiving means are integrally molded into said plastic buckle housing and have surfaces thereon for guiding the electrical contacts into predetermined positions and in which portions of said contacts are wedged into said slotted receiving means and held thereby.

6. A seat belt buckle in accordance with claim 5 in which said actuator comprises a lever and a post upstanding from said bottom wall of said plastic housing mounts said lever for turning to engage and actuate said electrical contacts, said lever having a first cam surface for engaging and shifting one of said contacts and a second cam surface for engaging and shifting the other of said contacts.

7. In a safety belt buckle, the combination comprising
 a. a buckle housing,
 b. opening means in said housing for receiving a latch plate,
 c. switch means carried within said housing for indicating when said latch plate is received therein,
 d. said switch means comprising
  i. a pair of flexible contact arms movable between an open position in which said arms are spaced apart and a closed position in which said arms touch, and
  ii. actuator means disposed adjacent to said opening means for said latch plate and being engageable positively against each of said arms to assure positive movement of each to one of said positions,
each of said contact arms being mounted at one end to said housing means and having a wiping surface at the other end which is slideably engageable with the wiping surface of the other arm, said actuator including a first cam surface to abut one of said arms and a second cam surface to engage the other arm to bend the other arm away from said one arm, said first and second cam surfaces being relatively disposed so that upon insertion of said latch plate said first cam surface engages said one arm before said second cam surface engages said other arm whereby the wiping surface of said one arm is caused to slideably disengage the wiping surface of said other arm before the second cam surface engages the other arm and bends it away to said open position.

8. In a safety belt buckle having a switch means operable by insertion of or removal of a tongue plate from a latched or unlatched relationship with respect to a latching mechanism mounted within a metal buckle body covered on the lower half thereof by a plastic cover housing, the improvement comprising a pair of electrical contacts in said switch means being received in seating portions therefor in said plastic cover housing, a bottom wall of said buckle body overlying said electrical contacts and holding the same against upward movement from the plastic buckle housing, a post integrally formed on said plastic cover housing and having an upper free end, a switch actuator means being pivotally mounted on said post of said cover housing and having a portion projecting upwardly through openings in said bottom wall of said buckle body for engagement by said tongue plate, said actuator means being held by said bottom wall of said buckle means against upward movement from said free end of said post in said plastic buckle housing and insulating means overlying said switch means and between said switch means and said bottom wall of said buckle body.

* * * * *